United States Patent Office 3,086,028
Patented Apr. 16, 1963

3,086,028
3-AMINO ESTRANES
Erich Hecker, Munich, Germany, assignor to Schering Aktiengesellschaft, Berlin, Germany
No Drawing. Filed Apr. 15, 1960, Ser. No. 22,412
Claims priority, application Germany Apr. 22, 1959
8 Claims. (Cl. 260—397.3)

The present invention relates to new estrane derivatives, and more particularly to 3-amino estrane compounds.

Amino compounds of the estrane series with an aromatic amino group, that is with an amino group which is joined to a carbon atom of an aromatic ring of the compound of the estrane series, have not been known prior to the present invention. It is particularly true that no derivatives of estradiol or estrones in which the 3-position phenolic hydroxyl group is substituted by an amino group have been known.

It is a primary object of the present invention to provide such compounds. Thus, the present invention provides compounds of the estrane series wherein the 3-position phenolic hydroxyl group of an estradiol or estrone-like compound is substituted by an amino group.

It is another object of the present invention to provide compounds of the estrane series with an azo group linked to the 3-position.

It is a further object of the present invention to provide methods of producing the new compounds of the present invention.

Other objects and advantages of the present invention will be apparent from a further reading of the specification and of the appended claims.

With the above objects in view, the present invention mainly comprises a compound having the following general formula:

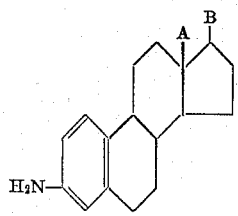

wherein A is selected from the group consisting of hydrogen and methyl, and wherein B is selected from the group consisting of =O, —OH and

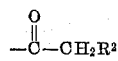

wherein $R^2$ is selected from the group consisting of hydrogen, OH, Oalk wherein alk is a lower alkyl, and Oacyl wherein acyl is derived from a lower aliphatic carboxylic acid.

The present invention also comprises azo compounds having the following general formula:

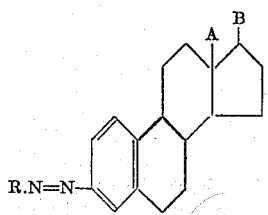

wherein R is selected from the group consisting of 2,4-dinitrophenyl, phenyl and $H_2N.CO$—, wherein A is selected from the group consisting of hydrogen and methyl, and wherein B is selected from the group consisting of =O, —OH and

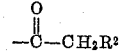

wherein $R^2$ is selected from the group consisting of hydrogen, OH, Oalk wherein alk is a lower alkyl, and Oacyl wherein acyl is derived from a lower aliphatic carboxylic acid.

It has been found in accordance with the present invention that the above set forth compounds can be produced by reacting a hydrazine derivative with a quinole of the estrane series, that is a compound having the following general formula:

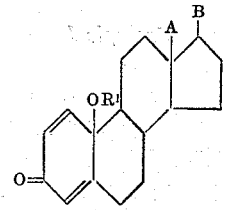

wherein A and B have the same definitions as above and wherein $R^1$ is either hydrogen or an acyl, particularly a lower acyl, and most particularly acetyl. These quinoles of the estrane series may be easily obtained according to the method of German Patent No. 1,051,802 or according to the method of Gould and Schwenk in Journal of the American Chemical Society, vol. 80, page 5683 (1958).

The reaction of a quinole of the estrane series of the above type with a hydrazine derivative such as 2,4-dinitrophenylhydrazine, phenylhydrazine or semicarbazide results in reaction with the phenolic hydroxyl group in the 3-position to form the corresponding azo dyestuff. This reaction proceeds as follows:

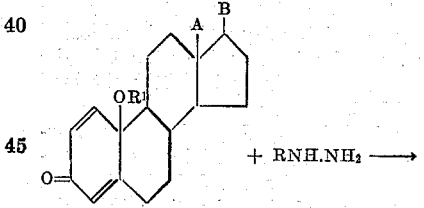

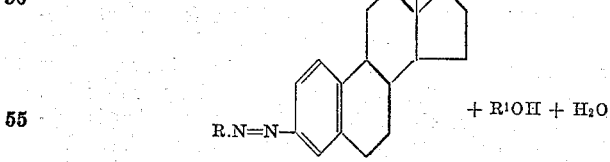

The resulting azo dyestuff may then be reductively split for example by hydrogenation to form the 3-amino compound. This reaction proceeds in accordance with the following equation:

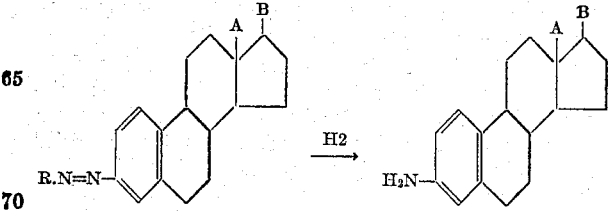

The reaction of the quinole with the hydrazine compound may be catalyzed by an acid. This reaction is preferably carried out in a suitable organic solvent of the usual type.

The reductive splitting of the azo dyestuff is suitably carried out with a reducing agent such as a dithionite, particularly sodium dithionite, or by catalytic hydrogenation in the presence of a catalyst such as a nickel catalyst, particularly Raney nickel, in a suitable organic solvent.

The azo compounds produced according to the present invention are actually azo dyestuffs and additionally serve as valuable intermediates in the production of new steroid compounds. The new amines of the present invention have an estrogen action and also are additionally very valuable as starting materials for the production of other valuable steroid compounds.

The following examples are given to further illustrate the present invention. The scope of the invention is not, however, meant to be limited to the specific details of the examples.

*Example 1*

(a) (1) 0.5 millimol of 17β-acetoxy-estra-p-quinole having a melting point of 176–178° C. or its 10ξ-acetate having a melting point of 215–217° C. are dissolved in glacial acetic acid and reacted with 10 cc. of DNPH reagent (saturated solution of 2,4-dinitrophenylhydrazine in glycolmonomethylether: 20 mg./cc.). The azo dyestuff separates in 24 hours in a more or less quantitative degree. The dry residue which is obtained from the mother liquor gives an additional small yield which is obtained by chromatography over aluminum oxide. The obtained azo compound which is 3-(2,4-dinitrophenyl)-azo-17β-acetoxy-Δ$^{1,3,5(10)}$-estratriene melts at 212–213° C. (from glycolmonomethylether+acetone). The empirical formula is $C_{26}H_{28}N_4O_6$.

(2) 0.5 millimol of 17β-acetoxy-estra-p-quinole-acetate-(10ξ) are dissolved in 10 cc. of DNPH reagent and 1 millimol of p-toluene sulfonic acid dissolved in 1 cc. of methanol are added thereto. After 2 hours the separation of the azo dyestuff commences and after 24 hours the azo dyestuff is filtered off under suction. The mother liquor after dilution with water is shaken with chloroform. The chloroform solution is separated and upon evaporation of the chloroform the remaining dry residue is subjected to chromatography over aluminum oxide to obtain the remainder of the yield. The melting point of the obtained compound is 212–213° C.

(b) (1) 0.5 millimol of the azo dyestuff produced according to (a) (1) or (2) are dissolved in glycolmonomethylether at a temperature of about 80° C. 4 cc. of a freshly produced saturated solution of sodium dithionite in water are added to the warm solution and then 4 cc. of 2 normal sodium carbonate solution are added thereto. The solution at first turns red and in a few minutes becomes colorless. The reaction mixture is maintained at a temperature of 80° C. for about 20 minutes. After cooling the reaction mixture is worked up with ether. The dry residue obtained from the ether solution is subjected to chromatography over aluminum oxide. The yield is 70–80% of the theoretical of pure 3-amino-17β-acetoxy-Δ$^{1,3,5(10)}$-estratriene having a melting point of 182–183° C. (from methanol+carbon tetrachloride).

(2) 1 millimol of the azo dyestuff obtained according to (a) above is dissolved in 40 cc. of tetrahydrofurane and with addition of 4 g. of Raney nickel moistened with water hydrogenated at normal pressure. The take-up of hydrogen is completed in about 1 and ½ hours and the solution is colorless. The reaction mixture is filtered to separate the catalyst and then taken up in methylenechloride, washed with water and dried over sodium sulfate. The dry residue is subjected to chromatography over aluminum oxide. The yield of pure 3-amino-17β-acetoxy-Δ$^{1,3,5(10)}$-estratriene having a melting point of 182–183° C. is approximately 80% of the theroetical. The empirical formula is $C_{20}H_{27}O_2N$.

*Example 2*

In an analogous manner to that described in Example 1 starting from 17β-hydroxy-estra-p-quinole having a melting point of 218–221° C. or from its 10ξ acetate having a melting point of 181–183° C. by first producing the corresponding azo dyestuff 3-(2,4-dinitrophenyl)-azo-17β-hydroxy-Δ$^{1,3,5(10)}$-estratriene having the empirical formula $C_{24}H_{26}N_4O_5$, the desired 3-amino-17β-hydroxy-Δ$^{1,3,5(10)}$-estratriene having a melting point of 138–139° C. (from methanol) is produced. The empirical formula of this compound is $C_{18}H_{25}ON$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a 3-amino steroid compound of the formula:

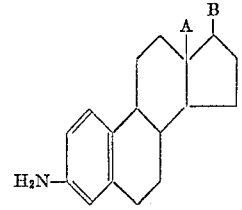

wherein A is selected from the group consisting of hydrogen and methyl, and wherein B is selected from the group consisting of =O, —OH and Oacyl wherein acyl is derived from a lower aliphatic carboxylic acid, which comprises reacting a compound of the formula:

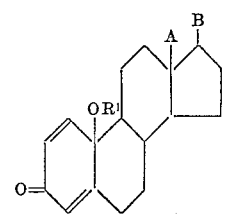

wherein A and B have the same definitions as above and wherein $R^1$ is selected from the group consisting of hydrogen and lower acyls with a hydrazine derivative selected from the group consisting of phenylhydrazine, semicarbazide and 2,4-dinitrophenylhydrazine so as to form the corresponding azo compound having the following general formula:

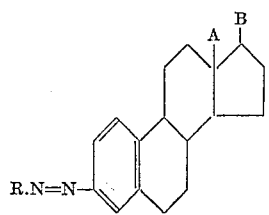

wherein A and B have the same definitions as above and wherein R is selected from the group consisting of 2,4-dinitrophenyl, phenyl and $H_2N.CD$—; and subjecting the thus formed azo compound to reduction of the azo group thereof, thereby splitting the same and forming the corresponding 3-amino steroid compound.

2. A method of producing a 3-amino steroid compound of the formula:

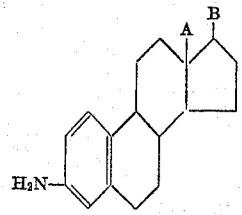

wherein A is selected from the group consisting of hydrogen and methyl, and wherein B is selected from the group consisting of =O, —OH and Oacyl wherein acyl is derived from a lower aliphatic carboxylic acid, which comprises reacting a compound of the formula:

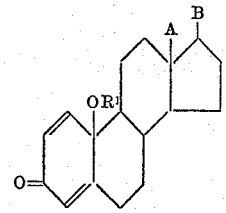

wherein A and B have the same definitions as above and wherein $R^1$ is selected from the group consisting of hydrogen and lower acyls with a hydrazine derivative selected from the group consisting of phenylhydrazine, semicarbazide and 2,4-dinitrophenylhydrazine in the presence of an acid catalyst so as to form the corresponding azo compound of the formula:

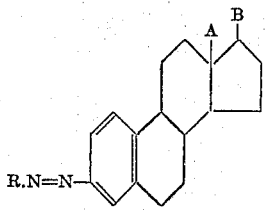

wherein A and B have the same definitions as above and wherein R is selected from the group consisting of 2,4-dinitrophenyl, phenyl and $H_2N.CO$—; and subjecting the thus formed azo compound to reduction of the azo group thereof, thereby splitting the same and forming the corresponding 3-amino steroid compound.

3. A method of producing a 3-amino steroid compound of the formula:

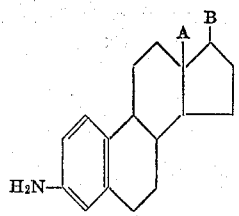

wherein A is selected from the group consisting of hydrogren and methyl, and wherein B is selected from the group consisting of =O, —OH and Oacyl wherein acyl is derived from a lower aliphatic carboxylic acid, which comprises reacting a compound of the formula:

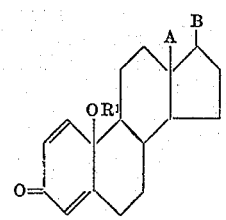

wherein A and B have the same definitions as above and wherein $R^1$ is selected from the group consisting of hydrogen and lower acyls with a hydrazine derivative selected from the group consising of phenylhydrazine, semicarbazide and 2,4-dinitrophenylhydrazine so as to form the corresponding azo compound of the formula:

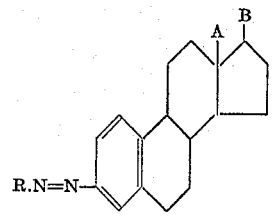

wherein A and B have the same definitions as above and wherein R is selected from the group consisting of 2,4-dinitrophenyl, phenyl and $H_2N.CO$—; and reductively splitting said azo compound to the corresponding 3-amino steroid compound by means of a dithionite.

4. A method of producing a 3-amino steroid compound of the formula:

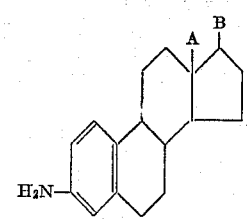

wherein A is selected from the group consisting of hydrogen and methyl, and wherein B is selected from the group consisting of =O, —OH and Oacyl wherein acyl is derived from a lower aliphatic carboxylic acid, which comprises reacting a compound of the formula:

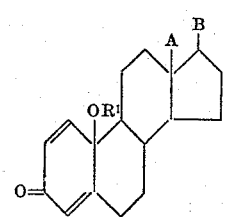

wherein A and B have the same definitions as above and wherein $R^1$ is selected from the group consisting of hydrogen and lower acyls with a hydrazine derivative selected from the group consisting of phenylhydrazine, semicarbazide and 2,4-dinitrophenylhydrazine so as to form the corresponding azo compound of the formula:

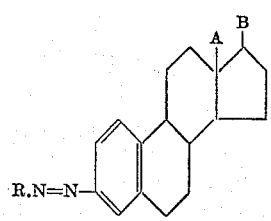

wherein A and B have the same definitions as above and wherein R is selected from the group consisting of 2,4-dinitrophenyl, phenyl and $H_2N.CO$—; and reductively splitting said azo compound to the corresponding 3-amino steroid compound by means of sodium dithionite.

5. A method of producing a 3-amino steroid compound of the formula:

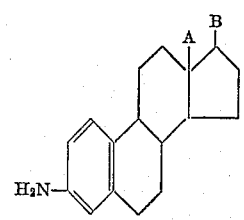

wherein A is selected from the group consisting of hydrogen and methyl, and wherein B is selected from the group consisting of =O, —OH and Oacyl wherein acyl is derived from a lower aliphatic carboxylic acid, which comprises reacting a compound of the formula:

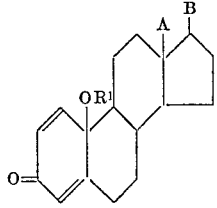

wherein A and B have the same definitions as above and wherein $R^1$ is selected from the group consisting of hydrogen and lower acyls with a hydrazine derivative selected from the group consisting of phenylhydrazine, semicarbazide and 2,4-dinitrophenylhydrazine so as to form the corresponding azo compound of the formula:

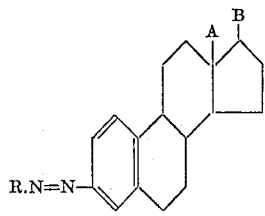

wherein A and B have the same definitions as above and wherein R is selected from the group consisting of 2,4-dinitrophenyl, phenyl and $H_2N.CO$—; and reductively splitting said azo compound to the corresponding 3-amino steroid compound by catalytic hydrogenation in the presence of a nickel catalyst.

6. A method of producing a 3-amino steroid compound of the formula:

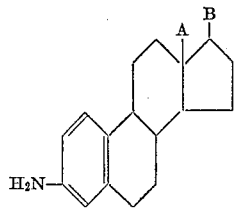

wherein A is selected from the group consisting of hydrogen and methyl, and wherein B is selected from the group consisting of =O, —OH and Oacyl wherein acyl is derived from a lower aliphatic carboxylic acid, which comprises reacting a compound of the formula:

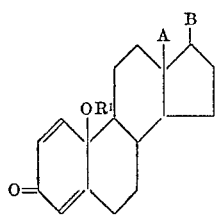

wherein A and B have the same definitions as above and wherein $R^1$ is selected from the group consisting of hydrogen and lower acyls with a hydrazine derivative selected from the group consisting of phenylhydrazine, semicarbazide and 2,4-dinitrophenylhydrazine so as to form the corresponding azo compound of the formula:

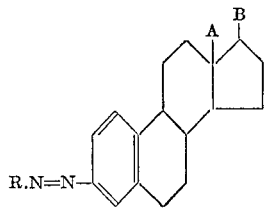

wherein A and B have the same definitions as above and wherein R is selected from the group consisting of 2,4-dinitrophenyl, phenyl and $H_2N.CO$—; and reductively splitting said azo compound to the corresponding 3-amino steroid compound by catalytic hydrogenation in the presence of Raney nickel as catalyst.

7. A method of producing a 3-amino steroid compound of the formula:

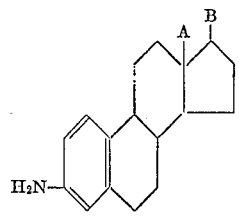

wherein A is selected from the group consisting of hydrogen and methyl, and wherein B is selected from the group consisting of =O, —OH and Oacyl wherein acyl is derived from a lower aliphatic carboxylic acid, which comprises reacting a compound of the formula:

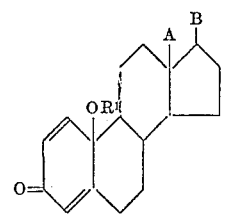

wherein A and B have the same definitions as above and wherein $R^1$ is selected from the group consisting of hydrogen and lower acyls with a hydrazine derivative selected from the group consisting of phenylhydrazine, semicarbazide and 2,4-dinitrophenylhydrazine in the presence of an acid catalyst so as to form the corresponding azo compound of the formula:

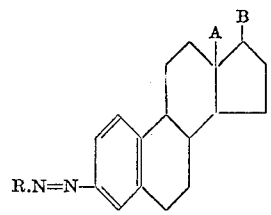

wherein A and B have the same definitions as above and wherein R is selected from the group consisting of 2,4-dinitrophenyl, phenyl and $H_2N.CO$—; and reductively splitting said azo compound to the corresponding 3-amino steroid compound by means of a dithionite.

8. A method of producing a 3-amino steroid compound of the formula:

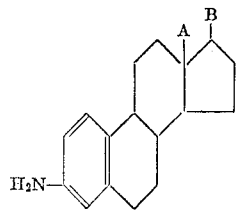

wherein A is selected from the group consisting of hydrogen and methyl, and wherein B is selected from the group consisting of =O, —OH and Oacyl wherein acyl is derived from a lower aliphatic carboxylic acid, which comprises reacting a compound of the formula:

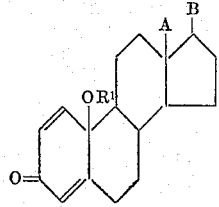

wherein A and B have the same definitions as above and wherein $R^1$ is selected from the group consisting of hydrogen and lower acyls with a hydrazine derivative selected from the group consisting of phenylhydrazine, semicarbazide and 2,4-dinitrophenylhydrazine in the presence of an acid catalyst so as to form the corresponding azo compound of the formula:

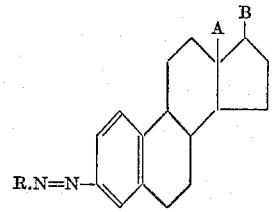

wherein A and B have the same definitions as above and wherein R is selected from the group consisting of 2,4-dinitrophenyl, phenyl and $H_2N.CO$—; and reductively splitting said azo compound to the corresponding 3-amino steroid compound by catalytic hydrogenation in the presence of a nickel catalyst.

References Cited in the file of this patent

UNITED STATES PATENTS

| | | |
|---|---|---|
| 2,225,419 | Logemann et al. | Dec. 17, 1940 |
| 2,418,603 | Schwenk et al. | Apr. 8, 1947 |
| 2,824,096 | Heckert | Feb. 18, 1958 |
| 2,884,410 | Randall | Apr. 28, 1959 |
| 2,940,990 | Volkov et al. | June 14, 1960 |
| 2,949,477 | Jiu | Aug. 16, 1960 |